(12) United States Patent
Windirsch

(10) Patent No.: US 6,760,439 B1
(45) Date of Patent: Jul. 6, 2004

(54) DEVICE FOR IMPLEMENTING A BLOCK-CIPHERING PROCESS

(75) Inventor: Peter Windirsch, Dreieich (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/445,337

(22) PCT Filed: May 13, 1998

(86) PCT No.: PCT/EP98/02803
§ 371 (c)(1),
(2), (4) Date: Mar. 7, 2000

(87) PCT Pub. No.: WO98/57461
PCT Pub. Date: Dec. 17, 1998

(30) Foreign Application Priority Data

Jun. 7, 1997 (DE) ........................................ 197 24 072

(51) Int. Cl.$^7$ ................................................ G06F 9/00
(52) U.S. Cl. ............................ 380/37; 380/47; 380/28; 380/277
(58) Field of Search ........................... 380/37, 277, 47, 380/28

(56) References Cited

U.S. PATENT DOCUMENTS

| | | | | |
|---|---|---|---|---|
| 4,078,152 A | * | 3/1978 | Tuckerman, III | 380/37 |
| 4,107,458 A | * | 8/1978 | Constant | 380/37 |
| 4,195,200 A | * | 3/1980 | Feistel | 380/37 |
| 4,377,862 A | * | 3/1983 | Koford et al. | 714/748 |
| 5,671,284 A | * | 9/1997 | Buer | 380/29 |

FOREIGN PATENT DOCUMENTS

| | | |
|---|---|---|
| DE | 40 16 203 | 11/1991 |
| EP | 0 454 187 | 10/1991 |

OTHER PUBLICATIONS

B. Schneier, 9.8 Output–feedback Mode (OFB) Applied Cryptography, 2$^{nd}$ Ed. 1995, pp. 203–205.
"Information Processing—Modes of Operation for an N–bit Block Cipher Algorithm," ISO/IEC 10116: 1991 (E), pp. 1–13.

* cited by examiner

*Primary Examiner*—Thomas R. Peeso
(74) *Attorney, Agent, or Firm*—Kenyon & Kenyon

(57) ABSTRACT

The invention relates to a device for implementing a block-ciphering process using an encryption/decryption arithmetic-logic module (3) which is supplied with the data stream of word length $j \leq n$ to be ciphered. The invention is characterized in that the arithmetic-logic module (3) includes a plurality of encryption/decryption elements (5), each of which forms a stage of a computing pipeline, the stages being designed such that they operate independently of each other in different modes of operation and with different keys. Supported by further components and data paths surrounding the encryption/decryption arithmetic-logic module (3), the invention allows up to p data streams, each with independently selectable word lengths $j \leq n$ and modes of operation, to be encrypted or decrypted simultaneously. In addition, the architecture of the device permits different logical data streams to be processed directly consecutively and free of conflict on the physical channels provided by the hardware resources.

23 Claims, 1 Drawing Sheet

DEVICE FOR IMPLEMENTING A BLOCK-CIPHERING PROCESS

FIELD OF THE INVENTION

The present invention relates to a device for implementing a block-ciphering process using an encryption/decryption arithmetic-logic module which is supplied with a data stream of word length n that is to be ciphered.

BACKGROUND INFORMATION

The German Patent No. 4016203 describes a device of this type for implementing a block-ciphering process. The conventional arithmetic-logic module has a plurality of encryption/decryption elements, each of which forms a stage of a computing pipeline. The individual stages of the computing pipeline are able to operate with different keys.

The disadvantage of the conventional device is that different operating modes are not executable, to be named in particular being the operating modes defined in the ISO-10116 standard (ECB, CBC, CBC-MAC, CFB, OFB).

The European Patent No. 0 454 187 describes a random-data generator, usable for ciphering operations, having an arithmetic-logic module with a pipeline structure which is subdivided into a plurality of processing channels. When generating the random data in this generator, the data in all channels are linked to one another. It is not possible to process a plurality of input-data streams simultaneously.

SUMMARY OF THE INVENTION

Therefore, an object of the invention is a device capable of encrypting/decrypting different data streams in various ISO-10116 modes of operation simultaneously.

According to the present invention, upstream of an arithmetic-logic module is an exclusive OR gate that carries out a bit-by-bit logical combination of two input words of word length n, one input of the exclusive OR gate is connected to a first multiplexer device, and the second input is connected to a second multiplexer device. According to the present invention, the input-data stream is fed to the first multiplexer device. In addition, the present invention provides for one input of the second multiplexer device to be connected to an output of a temporary storage device designed to store a plurality of start and initialization values for the ciphering process, as well as data-input and feedback values. Because a plurality of start and initialization values, i.e., data-input and feedback values for the ciphering processes are held ready in the temporary storage device, it is advantageously possible to provide a single device that can be operated in different operating modes. Furthermore, the temporary storage of data-input and feedback values by the temporary storage device provided in the present invention also makes it possible to switch over to a different operating mode within a data stream to be ciphered. Therefore, the device according to the present invention makes it possible to provide the ISO-10116 operating modes in terms of hardware. Moreover, due to the layout of the data paths according to the present invention between the devices connected in incoming circuit to the arithmetic-logic module, in particular the exclusive OR gate and a first and second multiplexer device, and due to the provision according to the present invention of a temporary storage device, it is also possible to encrypt and/or decrypt different data streams in different ISO-10116 operating modes simultaneously. In addition, a conflict-free change of the operating modes for the various data streams to be processed is possible without at the same time interrupting the processing. Particularly because of the provision of a temporary storage device, it is also possible to take advantage of the processing of a plurality of data streams in time-division multiplex operation. Security is also advantageously increased, such that decryption by unauthorized persons is nearly ruled out, since using an operating mode (CBC, CFB, OFB), and given the same key, a greater "scrambling" of the data is achieved due to the feedback of (intermediate-) results than in the case of the simpler ECB operating mode.

Owing to the multi-stage computing pipeline, hardware resources are made available for simultaneously processing a number of data streams, corresponding to the number of stages, which are independent of one another and shall be designated as physical channels.

The independence of the physical channels makes it possible to create independent logical channels and to map them onto the physical channels. It is possible for the number of logical channels to exceed the number of physical channels. The use of the physical channels by the logical channels takes place in time-division multiplex operation. Such a logical channel is characterized by a data stream for the encryption/decryption of the respective mode of operation, as well as the associated key and, if applicable, a start/initialization value. In order to make a clearer distinction, in the following, the logical channels are also referred to as contexts.

The device according to the present invention allows ISO 10116 modes of operation to be implemented in encryption processes, the computing pipeline is operated in several rounds for carrying out the encryption/decryption operation. Typical examples of encryption processes are the IDEA (International Data Encryption Algorithm) or the DES (Data Encryption Standard) processes.

A further advantage of the device according to the invention is that it is hot necessary to observe any restrictions whatsoever with regard to the combinations, occurring in the event of a context change, of the preceding mode of operation (for a context which is to be swapped out) and the following mode of operation (for the context to be newly initialized).

In an appropriate design of the device on conflict-free data transmission paths, given the simultaneous conclusion of operation in one context (transmission and securing of the results or of the start value for restarting the encryption/decryption process in the context now ended) and the start of operation in the new context, no additional delay is needed in the event of a context change.

Context changes without additional delays are achieved by an operation-overlapping change of subkey or key. The subkeys or keys required for the new context are loaded in the storage elements allocated to the encryption/decryption elements in such a manner that keys, which have already been executed by the presently still active context, are overwritten in the storage elements.

During normal operation (start/continuation/end of a further encryption/decryption in a currently active context without a directly preceding/following change of context), all data paths outside the arithmetic-logic module are assigned to a channel for the duration of a clock-pulse period. Conversely, when there is a change of context (the old logical channel is ended, its newly calculated start value is stored outside the present device for a resumption of the context, and the new logical channel is initialized and commences execution in the same clock pulse), both the old context to be swapped out (in the output area of the device) and the new context to be swapped in (in the input area of the device) are simultaneously active.

The incorporation of data-valid information for characterizing the data located in a pipeline stage guarantees continuous operation even in cases where, due to different data rates in the different active contexts, temporarily no valid input data is available for one or more channels. In such cases, the computing pipeline is not stopped, but continues in operation while the channel(s).without valid input data is (are) marked. The incorporation of valid-data bits and the mode of operation in each channel of the pipeline (i.e. in a separate lookup table) is necessary for the conditional storage of intermediate results in the register elements provided, or in a data buffer connected to the data output and also in order to determine the data paths used by the channel.

BRIEF DESCRIPTION OF THE DRAWINGS

The single FIGURE shows a block diagram of a device for implementing a block-ciphering process according to the present invention.

DETAILED DESCRIPTION

Figure 1:
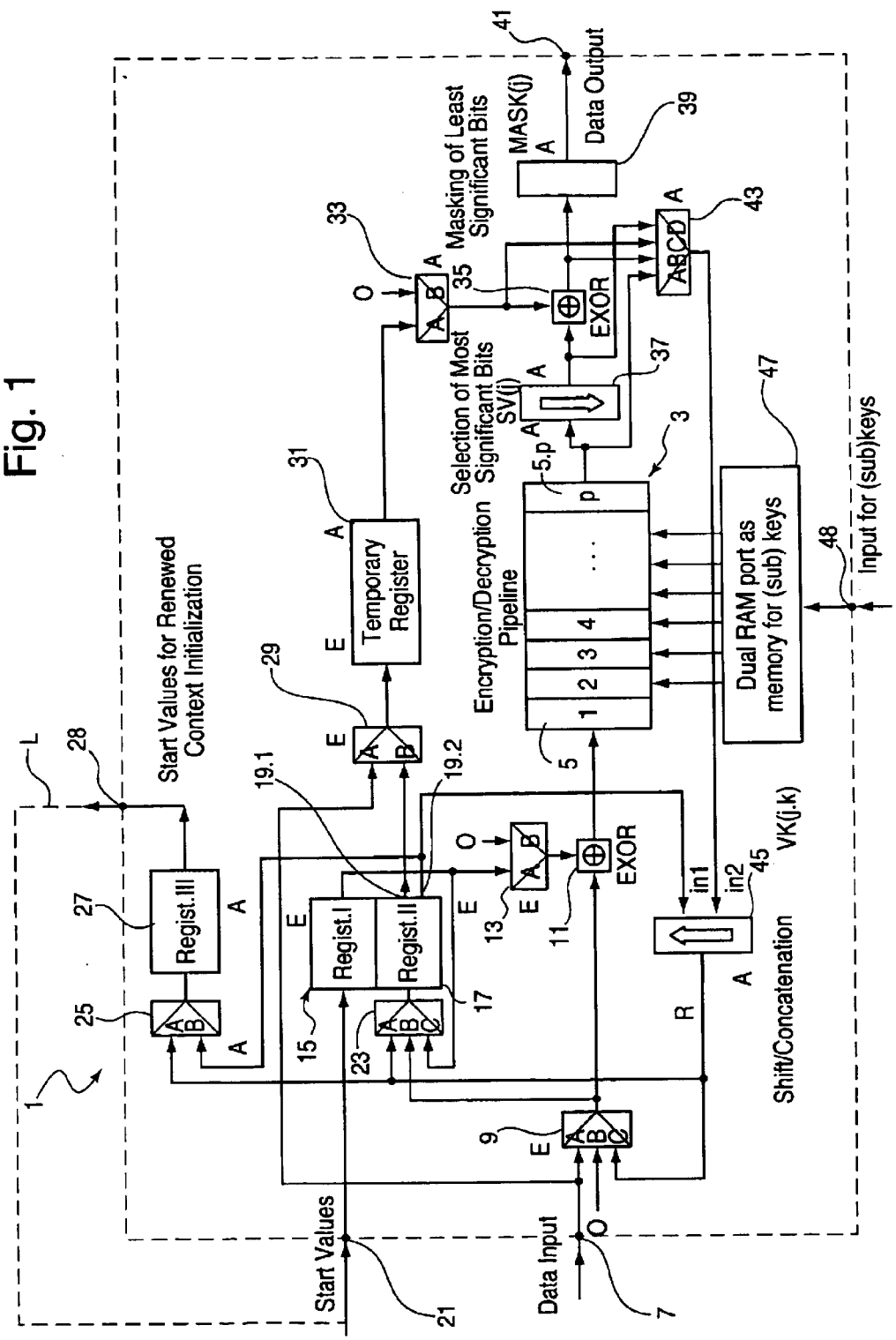

A device 1, shown in the FIGURE, for implementing a block-ciphering process includes an arithmetic-logic module 3 that represents the heart of the encryption/decryption. Arithmetic-logic module 3 itself is composed of p arithmetic-logic-module units 5, each being designed to execute an encryption/decryption (sub)function. However, the internal structure of these arithmetic-logic-module units 5 will not be discussed at this point.

Arithmetic-logic-module units 5 shown in the drawing, which operate independently of each other, form an arithmetic-logic-module pipeline in which encryption/decryption is carried out in several steps and, if necessary, in several rounds.

The data stream to be encrypted/decrypted is fed to a data input 7 of device 1. This data stream is formed by a sequence of data words whose length is $j \leq n$ bits and which, in the following, will also be referred to as data signals. Only the j least significant bits of the input data stream are processed during the encryption/decryption. The most significant (n−j) bits are not taken into consideration in the encryption/decryption process and can be used, for example, for storing control information to be transmitted without being encrypted.

The data signals present at the data input are fed to an input of a multiplexer 9. The output signal of word length n of 3:1 multiplexer 9 is conveyed to an exclusive OR gate 11 whose output is connected to first stage 5 of arithmetic-logic module 3. The second input signal, required for the logic operation in exclusive OR gate 11, is supplied by a 2:1 multiplexer 13 of word length n. The exclusive OR gate combines the two n-bit input signals bit-by-bit to obtain an output signal of identical word length.

This multiplexer 13 selects one of two available input signals, one of which has a constant value; in the present embodiment, this is the bit vector 0 having a word length of n bits. The other input signal is supplied either by a first register 15 or a second register 17.

First register 15 is a storage device capable of storing p data words having the word length of n bits. To increase flexibility, it is also conceivable for first register 15 to have different word lengths at the input (for example n, n/2, . . . bits) and at the output (n bits), the input word length is converted to the n-bit output word length in the register. First register 15 itself is used to record the start/initialization value for the modes of operation CBC (Cipher Block Chaining), CFB (Cipher Feed-Back) and OFB (Output FeedBack). A detailed description of these modes of operation can be found in ISO/IEC 10116, 1991 (E), "*Information Processing-Modes of Operation for n-Bit Block Cipher Algorithm*", International Organization for Standardization, so that there is no need to further describe these processes at this point.

Second register 17 is likewise designed as a storage device capable of storing p data words that have a word length of n bits. In contrast to first register 15, second register 17 has two outputs 19.1, 19.2, output 19.1 is connected to the input of multiplexer 13. Second register 17 is used to record data input values or feedback values for the modes of operation mentioned with respect to first register 15.

At upper output 19.1, it is possible to obtain either the addressed stored value or the input value present at the input of second register 17. Conversely, only the addressed stored value can be read out at output 19.2. In addition, second register 17 is designed so that, simultaneously with the readout of one data signal, a data signal to be stored next can be loaded into the register.

Although, in the FIGURE, the output of first register 15 and output 19.1 of second register 17 are joined, either one or the other of the two stored values of registers 15, 17 is transmitted to the input of multiplexer 13. For this purpose, both registers 15, 17 are provided with a "tri-state driver" making it possible to switch the output to a high-resistance value. Alternatively, however, a corresponding signal selection can also be achieved by using a 2:1 multiplexer (not shown in the FIGURE).

First register 15 is supplied with a start/initialization signal via an input 21. Second register 17 is supplied with an input signal selected from three input signals by a 3:1 multiplexer 23. One of the input signals is the output signal of multiplexer 9; another input signal is the output signal of first register 15 or the output signal of second register 17 present at output 19.1. The third input signal of multiplexer 23—which, incidentally, likewise processes data signals of word length n—is a feedback signal R, which will be described in greater detail in the following paragraphs.

This feedback signal R is also present at an input of multiplexer 9. The third, and thus the last input signal of multiplexer 9 is a constant bit vector, preferably having the value 0.

Feedback signal R is likewise supplied as an input signal to a further 2:1 multiplexer 25 of word length n. The second input signal of multiplexer 25 is the signal present at output 19.2 of second register 17. The output signal of multiplexer 25 is supplied to the input of a third register 27. Third register 27 is also designed as a storage device capable of storing p data words that are n bits in length. It is possible, as in the case of first register 15, for different word lengths to be at the input (n bits) and at the output (for example n, n/2, . . . bits).

Third register 27 is used to record the calculated initialization value for subsequent encryption/decryption operations performed in the operation modes mentioned in connection with first register 15. The initialization value, i.e. the initialization signal, is buffered in third register 27 and, in response to a context change, is read out therefrom and supplied via output 28 of device 1 to an external buffer. As soon as the finished context is resumed, the buffered initialization value is supplied via input 21 as a start value to first register 15. This is indicated in the FIGURE by a dashed line L.

The FIGURE further shows a 2:1 multiplexer 29, which is supplied with the data signal present at output 19.1 of second register 17, and furthermore, with the data signal present at data input 7. From these two input signals, multiplexer 29 selects one data signal and supplies it as an input signal to a temporary register 31. This register is designed as a device for storing p data signals that have a word length of n bits, and is used to record a data-input or initialization signal for the duration of an encryption/decryption operation. The stored data signal of temporary register 31 is supplied as an input signal to a 2:1 multiplexer 33 whose second input is supplied with a constant bit vector, having the value 0 in this exemplary embodiment. The output signal of multiplexer 33 is supplied to an exclusive OR gate 35 for combination with a further input signal provided by a selection device 37. The input signal of this selection device 37 is the output signal of the last stage 5.p of arithmetic-logic module 3.

Selection device 37 is used to select the j most significant bit positions from the n-bit input value, and to insert them into the j least significant bit positions at the output. The remaining (n−j) most significant positions of the output value are filled with the value 0. Consequently, selection device 37 shifts the input value by (n−j) positions.

The function SV performed by selection device 37 can be represented as follows:

out[n−1:0]=SV(j,in[n−1:0])={zero[n−j−1:0],in [n−1:n−j]}.

In this case, the notation [i−1:0] is used for data lines or data signals of lengths i, bit [i−1] denoting the most significant bit (MSB) and bit [0] the least significant bit (LSB). The symbol { } denotes a concatenation of data signals/data lines to form a bus.

The output signal of exclusive OR gate 35 is supplied to a masking device 39 which subjects the input data signal to the following MASK function:

out[n−1:0]=MASK(j,in[n−1:0])={zero[n−j−1:0],in[j−1:0]} or if required out[n−1.0]=MASK(j,in[n−1:0])={in[n−1:0]}.

This means, in words, that the most significant (n−j) bits are masked to 0 by concatenating the j least significant bits of the input value using the result from the function zero [n−j−1:0] which yields an (n−j)-bit 0 vector. In the present exemplary embodiment, this masking can be switched off, so that also the most significant (n−j) bits—which, as already indicated in the description of data input 7, may be used to record, for example, control information that is to be transmitted in an unencrypted form—are transmitted unchanged to the output of masking device 39. The output signal of masking device 39 then forms,the data output signal of device 1, this data output signal is available at a data output 41.

For the feedback of an output signal of arithmetic-logic module 3, a 4:1 multiplexer 43 is provided that receives, as input signals, the output signals of arithmetic-logic module 3, selection device 37, exclusive OR gate 35 and multiplexer 33. From these four input signals of word length n, multiplexer 43 selects a data signal and supplies it, as a second input signal in2, to a shift and concatenation device 45. First input signal in1 is the data signal of second register 17 present at output 19.2. These two input signals in1, in2 are then combined in the following way with the aid of function VK:

out[n−1:0]=VK(j,k,in1[n−1:0],in2 [n−1:0])={in1[n−k−1:0],one[k−j−1:0],in2[j−1:0]}, i.e., a concatenation of the (n−k) least significant bits of input signal in1, of (k−j) 1-bits from the function one(k−j−1:0) and of the j least significant bits of the input signal in2 is implemented. The output signal of shift and concatenation device 45 then forms feedback signal R described above.

The FIGURE also shows that a storage device 47 is allocated to arithmetic-logic module 3, those arithmetic-logic module units 5 . . . 5.p requiring keys or subkeys in order to perform their encryption/decryption (sub)operations being connected to storage device 47. Storage device 47 is used to provide keys or subkeys required for encryption/decryption and, in the case of random operation of the p pipeline stages, it must hold keys or subkeys for at least p contexts. Depending on the mode of operation in the respective context, either the E (Encryption) or the D (Decryption) subkeys or keys named in the ISO 10116 standard must be stored in storage device 47. Two independently operable storage device interfaces are provided for simultaneous reading (for encryption/decryption) and writing (for the initialization of a new context via input 48). Storage device 47 is preferably a dual-port RAM (Random Access Memory, re-writeable storage with random access).

The FIGURE does not show that, in order to prevent downtimes of arithmetic-logic module 3, a "data-valid flag" is provided for each of p pipeline stages 5 to indicate whether valid data is present and being processed in the corresponding pipeline stage. At the end of an encryption/decryption operation, data is transmitted via data output 41 or the result is stored in registers 17 and/or 27 only if the data at the output of last pipeline stage 5.p was valid. The data-valid flags accompany the associated data on its way through arithmetic-logic module 3.

If no input data is present at a time when input data is expected for a context, the arithmetic-logic module is not stopped, but rather the associated data-valid flag is merely set to "data invalid". In such a case, data for this context can only be accepted again after a complete encryption/decryption round (after r·p clock pulses, where r represents the number of rounds required by the encryption algorithm (i.e. the passages of a data item to be processed through arithmetic-logic-module pipeline 3) and p represents the number of pipeline stages).

For the sake of clarity, the address lines to registers 15, 17, 27 and 31 are not shown in the FIGURE. Both the read accesses to first register 15, second register 17 and temporary register 31, as well as the write accesses to temporary register 31, second register 17 and third register 27 are jointly addressed. The address indicates the number i e {1, 2 . . . p} of the context to which the entire structure outside of arithmetic-logic module 3 is assigned during the period in question.

Furthermore, for the purpose of simplification, only single lines are shown in the FIGURE. However, they represent data bus lines that are all designed to transmit data words of word length n bits. The only exceptions may be the data buses from input 21 to first register 15, from the output of third register 27 to output 28, as well as the data buses for the subkeys or keys between input 48 and storage device 47 or between storage device 47 and arithmetic-logic pipeline 3. Moreover, for the sake of clarity, the FIGURE does not show the timing circuits, which are required for the clocked transmission of the individual data words over the bus lines, and the corresponding logic operations in the individual logic elements.

Discussed in the following paragraph is the functioning of device 1 in the different modes of operation.

During a clock pulse, the entire structure or architecture outside the arithmetic-logic module 3 is available to a context, i.e. to a virtual or logical channel. Analogously, in arithmetic-logic module 3, each pipeline stage 5 is assigned its own context (virtual channel).

In the event of a context change, i.e. whenever the processing of a context is finished after the complete calculation of the result (encrypted/decrypted data item) and the result is saved for restarting the context and a new context is started, then the output area of the architecture is assigned to the finished context and the input area of the architecture is assigned to the started context. The components denoted in the FIGURE by the numbers 31, 33, 37, 39, 43, 45, 25, 35 and 27 are designated as output area. The components denoted by the numbers 9, 11, 13, 29, 15, 17 and 31, as well as the buses/data lines required for their connection, are designated as input area. For the purpose of clarification, each component of the output area is marked in the FIGURE by the letter A and each component of the input area by E.

The architecture-configuration information required for executing the block encipherment according to the already mentioned ISO 10116 standard is given in the table at the end of the specification, sorted according to mode of operation. Entries (I) and (F) in the first column of the table denote the encryption/decryption of the initial data block after a change of context (1) and the following encryption/decryption operations (F) for further data blocks in the same context. It should be noted that, in the event of a context change in a channel, the end of the last round of an encryption/decryption is executed simultaneously with the start of the initial round (I) for the new context. The initial round (I) for a newly initialized context is not permitted before data is available in the input buffer. For subsequent operations in the same context, the configuration "Start of initial round (F)" is selected which, in turn, simultaneously executes the end of the last round of the preceding operation and the start of the following operation.

The start of a round is understood as the provision of all input values at the inputs of arithmetic-logic module 3, of registers 15, 17, 27 (as far as required for the particular mode of operation) and of temporary register 31. Accordingly, the end of the last round for an encryption/decryption is understood as the transmission of the results from the outputs of arithmetic-logic module 3, registers 15, 17, 27 and temporary register 31.

The column headings indicate the reference numerals of the corresponding components in the FIGURE; the column contents indicate the connected input in the case of multiplexers (the inputs being denoted by the letters A, B, C or D) and the numerical function argument (in the case of the shift or masking devices 37, 39 or 45). The elements allocated to the vacant fields can be suitably set for saving the previous data set or for making available the following data set (possibly in a different encryption/decryption mode).

The following abbreviations apply to the write functions of second register 17 and third register 27:

WVO: write on valid pipeline output data; i.e., data is written to the register if there is valid data at the output of arithmetic-logic module 3;

WVI: write on valid input buffer data; i.e., data is written to the register if valid input data is available at data input 7;

-: no data is written.

Additionally, the following applies to second register 17:

B: bypass; direct combinatorial through-connection of the input of the second register to output 19.1, possibly with additional storage of the input value in the second register if valid input buffer data and output data from arithmetic-logic module 3 are available.

The following applies to third register 27:

W_II: write register II output; i.e., the output signal of second register 17 is stored.

In the modes of operation in question, values are written to temporary register 31 only if there is valid data at the data input.

If, in the event of a context change, there are write-access conflicts on second register 17 (i.e., both for the old and for the new contexts, there must be write accesses to second register 17 in accordance with the table) only the write access of the new context is executed. The value of the old context to be stored in register 17 could no longer be evaluated.

First register 15 and third register 27 are written to (first register) and read (third register) irrespective of the state of the encryption/decryption execution, and therefore, they are not listed in the table. The sole prerequisite for their write operation (first register) and read operation (third register) is the timely provision/readout of the data prior to a read request (first register) or write request (third register), such requests being caused by the encryption or decryption operation to be carried out.

Apart from the OFB_N_ISO-m Enc./Dec. operation mode (OFB mode of operation described by B. Schneier in "Applied Cryptography", 2nd Ed. 1995, John Wiley & Sons, Inc.), which is frequently used in practice and is not included in the ISO standard, all other modes of operation listed in the table (FIG. 2) conform to the constraints given in the ISO 10116 standard. Values frequently used in practice for the word lengths n and function arguments k and j, respectively, are n=64 and k=j=64,8,7,1.

In order to clarify the nomenclature used in the table, its meaning will be explained once again and illustrated by two examples.

The first mode of operation indicated in the table is the ECB-Enc./Dec. mode in which the input A of multiplexer 9, i.e. the data input signal at data input 7, is transmitted and combined at exclusive OR gate 11 with the signal of multiplexer 13 present at input B. Since this signal at multiplexer 13 has the constant value 0, the output signal of multiplexer 9, i.e. the data input signal at input 7, is supplied to the first stage of arithmetic-logic module 3. As soon as the first value has passed through arithmetic-logic module 3 and is not to be fed back again, the input signal at input B of multiplexer 33 is selected. Since this signal has a constant value of 0, the signal present at exclusive OR gate 35 is transmitted without being changed. The two letters n in columns 37 and 39 indicate that no change, i.e. selection or masking, takes place in the two devices 37 and 39.

The next mode indicated in the table is the CBC-Enc. mode, in which, in the first initialization round, the signals at inputs A of multiplexers 9 and 13 are transmitted to exclusive OR gate 11. There the start/initialization value stored in first register 15 is then suitably combined with the data input signal, the combined signal being supplied to arithmetic-logic module 3. Subsequently, the signals at inputs B of the two multiplexers 33 and 43 and the input signals at inputs A of multiplexers 23 and 25 are transmitted for encryption/decryption. The data signal is not changed by devices 37, 39 or 45. Furthermore, feedback signal R is written both to second register 17 and to third register 27. In the last round of this mode of operation, feedback signal R is written to third register 27 to serve as the starting value for a renewed context initialization. However, this data signal is not written to second register 17.

The other modes of operation listed an the table are to be understood accordingly.

Thus, it becomes apparent that, due to the independence of the pipeline stages, it is possible to create a device capable of processing different data streams in different encryption/decryption operation modes.

TABLE

| | Input area | | | | Output area | | | | | Data written to register | | |
|---|---|---|---|---|---|---|---|---|---|---|---|---|---|
| Mode of operation | 9 | 13 | 29 | 33 | 43 | 37 | 39 | 45 | 23 | 25 | 17 Reg. II | 31 Tmp Reg. | 27 Reg. III |
| ECB-Enc./Dec. | | | | | | | | | | | | | |
| Start of initial round | A | B | | | | | | | | | — | — | — |
| End of last round | | | | | B | | n | n | | | — | — | — |
| CBC-Enc. (or CBC-MAC) | | | | | | | | | | | | | |
| Start of initial round (I) CBC mode or CBC-MAC mode in processing of subsequent data of a context | A | A | | | | | | | | | — | — | — |
| Start of initial round (I) in CBC-MAC mode in the processing of the first data item in a context | A | B | | | | | | | | | — | — | — |
| Start of initial round (F) | A | A | | | B | B | n | n | n | A | A | WVO/B | — | WVO |
| End of last round | | | | | B | B | n | n | n | | A | — | — | WVO |
| CBC-Dec. | | | | | | | | | | | | | |
| Start of initial round (I) | A | B | B | | | | | | B | | WVI | WVI | — |
| Start of initial round (F) | A | B | B | A | | n | n | | B | B | WVI | WVI | W_II |
| End of last round | | | | A | | n | n | | | B | — | — | W_II |
| CFB-j, k-Enc. | | | | | | | | | | | | | |
| Start of initial round (I) | B | A | A | | | | | | C | | WVI | WVI | — |
| Start of initial round (F) | B | A | A | | A | B | j | j | j, k | A | A | WVO | WVI | WVO |
| End of last round | | | | | A | B | j | j | j, k | | A | — | — | WVO |
| CFB-j, k-Dec. | | | | | | | | | | | | | |
| Start of initial round (I) | B | A | A | | | | | | C | | WVO | WVI | — |
| Start of initial round (F) | B | A | A | | A | C | j | j | j, k | A | A | WVO/B | WVI | WVO |
| End of last round | | | | | A | C | j | j | j, k | | A | — | — | WVO |
| OFB-j-Enc./Dec. | | | | | | | | | | | | | |
| Start of initial round (I) | B | A | A | | | | | | | | — | WVI | — |
| Start of initial round (F) | B | A | A | | A | C | j | j | n | A | A | WVO/B | WVI | WVO |
| End of last round | | | | | A | C | j | j | n | | A | — | — | WVO |
| OFB_N_ISO-j-Enc./Dec. | | | | | | | | | | | | | |
| Start of initial round (I) | B | A | A | | | | | | | | — | WVI | — |
| Start of initial round (F) | B | A | A | | A | D | j | j | j, O | A | A | WVO/B | WVI | WVO |
| End of last round | | | | | A | D | j | j | j, O | | A | — | — | WVO |
| Intermediate rounds End of initial - start of last round | C | B | | | A | | | | n | | | — | — | — |

What is claimed is:

1. A device for implementing a block-ciphering process, comprising:

an arithmetic-logic module for performing at least one of an encryption operation and a decryption operation, the arithmetic-logic module being supplied with an input data stream to be at least one of encrypted and decrypted, the input data stream having a word length n, the arithmetic-logic module including a plurality of elements for performing at least one of the encryption operation and the decryption operation, each of the elements forming a stage of a computing pipeline, the stages operating with different keys, the arithmetic-logic module having different modes of operation;

a first exclusive OR gate arranged upstream of the arithmetic-logic module, the first exclusive OR gate performing a bit-by-bit logical combination of two input words of word length n;

a first multiplexer device connected to a first input of the first exclusive OR gate, the first multiplexer device being supplied with the input data stream;

a second multiplexer device being connected to a second input of the first exclusive OR gate; and a temporary storage device for storing a plurality of start, initialization, data-input and feedback values for the block-ciphering process, the temporary storage device having an output connected to an input of the second multiplexer device.

2. The device according to claim 1, further comprising:

a storage element capable of storing one of a key and a subkey, each of the plurality of elements being associated with the storage element, the plurality of elements requiring one of a key and a subkey to perform at least one of the encryption operation, an encryption suboperation, the decryption operation and a decryption suboperation.

3. The device according to claim 2, wherein the at least one storage element is a dual-port storage device.

4. The device according to claim 1, wherein the temporary storage device includes a first register element and a second register element, each of the register elements being capable of storing a plurality of data words of word length n, the number of data words being a number p corresponding to the stages of the computing pipeline of the arithmetic-logic module.

5. The device according to claim 4, wherein one of the two register elements has a first output and a second output, an addressed stored value being made available at the first output of the one of the two register elements, one of an input signal of the one of the two register elements and the addressed stored value being made available at the second output of the one of the two register elements.

6. The device according to claim 4, wherein the temporary storage device further includes a third register element storing one of an output signal of the second register element and a feedback signal.

7. The device according to claim 1, wherein:
the temporary storage device includes a first register element and a second register element, each of the register elements being capable of storing a plurality of data words of word length n, the number of data words being a number p corresponding to the stages of the computing pipeline of the arithmetic-logic module; and
one of the two register elements has a first output and a second output, an addressed stored value being made available at the first output of the one of the two register elements, one of an input signal of the one of the two register elements and the addressed stored value being made available at the second output of the one of the two register elements.

8. The device according to claim 7, wherein the temporary storage device further includes a third register element storing one of an output signal of the second register element and a feedback signal.

9. A device for implementing a block-ciphering process, comprising:
an arithmetic-logic module for performing at least one of an encryption operation and a decryption operation, the arithmetic-logic module being supplied with an input data stream to be at least one of encrypted and decrypted, the input data stream having a word length n, the arithmetic-logic module including a plurality of elements for performing at least one of the encryption operation and the decryption operation, each of the elements forming a stage of a computing pipeline, the stages operating with different keys, the arithmetic-logic module having different modes of operation;
a first exclusive OR gate arranged upstream of the arithmetic-logic module, the first exclusive OR gate performing a bit-by-bit logical combination of two input words of word length n;
a first multiplexer device connected to a first input of the first exclusive OR gate, the first multiplexer device being supplied with the input data stream;
a second multiplexer device being connected to a second input of the first exclusive OR gate;
a temporary storage device for storing a plurality of start, initialization, data-input and feedback values for the block-ciphering process, the temporary storage device having an output connected to an input of the second multiplexer device; and
an evaluation device having a first output and a second output, the evaluation device supplying at least one of an encrypted data stream and a decrypted data stream at the first output, the evaluation device supplying data at the second output, the data being fed back to the input of the arithmetic-logic module.

10. The device according to claim 9, wherein the evaluation device includes a selection element, a second exclusive OR gate and a masking element, the input data stream being routed from an output of the selection element via the second exclusive OR gate and the masking element to the first output of the evaluation device, the selection element selecting a number of bits of a data word present at an input of the selection element.

11. The device according to claim 10, wherein the second exclusive OR gate is supplied with a further data signal.

12. The device according to claim 11, wherein the evaluation device further includes a multiplexer element receiving as input signals an output signal of the arithmetic-logic module, an output signal of the selection element, an output signal of the second exclusive OR gate, and an input signal of the second exclusive OR gate.

13. The device according to claim 10, wherein the evaluation device further includes a further multiplexer element, an output of the further multiplexer being connected to an input of the exclusive OR gate, a second input of the further multiplexer being connected to a temporary storage element used for temporarily storing one of an output signal of a second register element and the input data stream.

14. The device according to claim 13, further comprising:
a logic element combining an output signal of the multiplexer element and the output signal of the second register element, the logic element supplying an output signal of the logic element to the first multiplexer device, an output of the first multiplexer device being connected to the first exclusive OR gate.

15. The device according to claim 9, further comprising:
a storage element capable of storing one of a key and a subkey, each of the plurality of elements being associated with the storage element, the plurality of elements requiring one of a key and a subkey to perform at least one of the encryption operation, an encryption suboperation, the decryption operation and a decryption suboperation.

16. The device according to claim 15, wherein the at least one storage element is a dual-port storage device.

17. The device according to claim 15, wherein the evaluation device includes a selection element, a second exclusive OR gate and a masking element, the input data stream being routed from an output of the selection element via the second exclusive OR gate and the masking element to the first output of the evaluation device, the selection element selecting a number of bits of a data word present at an input of the selection element.

18. The device according to claim 17, wherein the second exclusive OR gate is supplied with a further data signal.

19. The device according to claim 18, wherein the evaluation device further includes a multiplexer element receiving as input signals an output signal of the arithmetic-logic module, an output signal of the selection element, an output signal of the second exclusive OR gate, and an input signal of the second exclusive OR gate.

20. The device according to claim 17, wherein the evaluation device further includes a further multiplexer element, an output of the further multiplexer being connected to an input of the exclusive OR gate, a second input of the further multiplexer being connected to a temporary storage element used for temporarily storing one of an output signal of a second register element and the input data stream.

21. The device according to claim 20, further comprising:

a logic element combining an output signal of the multiplexer element and the output signal of the second register element, the logic element supplying an output signal of the logic element to the first multiplexer device, an output of the first multiplexer device being connected to the first exclusive OR gate.

22. The device according to claim 15, wherein the arithmetic-logic module is configured to perform one of an encryption operation and decryption operation on data having a word length $j \leq n$, the data of word length n–j being used to record control information to be transmitted in an unencrypted form.

23. A device for implementing a block-ciphering process, comprising:

an arithmetic-logic module for performing at least one of an encryption operation and a decryption operation, the arithmetic-logic module being supplied with an input data stream to be at least one of encrypted and decrypted, the input data stream having a word length n, the arithmetic-logic module including a plurality of elements for performing at least one of the encryption operation and the decryption operation, each of the elements forming a stage of a computing pipeline, the stages operating with different keys, the arithmetic-logic module having different modes of operation;

a first exclusive OR gate arranged upstream of the arithmetic-logic module, the first exclusive OR gate performing a bit-by-bit logical combination of two input words of word length n;

a first multiplexer device connected to a first input of the first exclusive OR gate, the first multiplexer device being supplied with the input data stream;

a second multiplexer device being connected to a second input of the first exclusive OR gate; and a temporary storage device for storing a plurality of start, initialization, data-input and feedback values for the block-ciphering process, the temporary storage device having an output connected to an input of the second multiplexer device;

wherein the arithmetic-logic module is designed for performing one of an encryption operation and decryption operation on data having a word length $j \leq n$, the data of word length n–j being used to record control information to be transmitted in an unencrypted form.

* * * * *